(No Model.)

F. ADEE.
WATER CLOSET.

No. 436,451.

3 Sheets—Sheet 1.

Patented Sept. 16, 1890.

WITNESSES:
Gustave Dieterich
William Goebel

INVENTOR
Fred. Adee
BY Briesen, Steele & Knauth
ATTORNEYS.

(No Model.) 3 Sheets—Sheet 2.

F. ADEE.
WATER CLOSET.

No. 436,451. Patented Sept. 16, 1890.

WITNESSES:
Gustave Dieterich.
William Goebel.

INVENTOR
Fred Adee
BY Briesen, Steele & Knauth
ATTORNEYS.

(No Model.) 3 Sheets—Sheet 3.

F. ADEE.
WATER CLOSET.

No. 436,451. Patented Sept. 16, 1890.

WITNESSES:
Gustave Dieterich
William Goebel.

INVENTOR
Fred Adee
BY Briesen, Steele & Knauth
ATTORNEYS

UNITED STATES PATENT OFFICE.

FRED ADEE, OF BROOKLYN, ASSIGNOR TO FRED ADEE & CO., OF NEW YORK, N. Y.

WATER-CLOSET.

SPECIFICATION forming part of Letters Patent No. 436,451, dated September 16, 1890.

Application filed July 18, 1889. Serial No. 317,863. (No model.)

*To all whom it may concern:*

Be it known that I, FRED ADEE, a resident of the city of Brooklyn, Kings county, and State of New York, have invented certain new and useful Improvements in Water-Closets, of which the following is a specification, reference being had to the accompanying drawings, forming part hereof, wherein—

Figure 1:
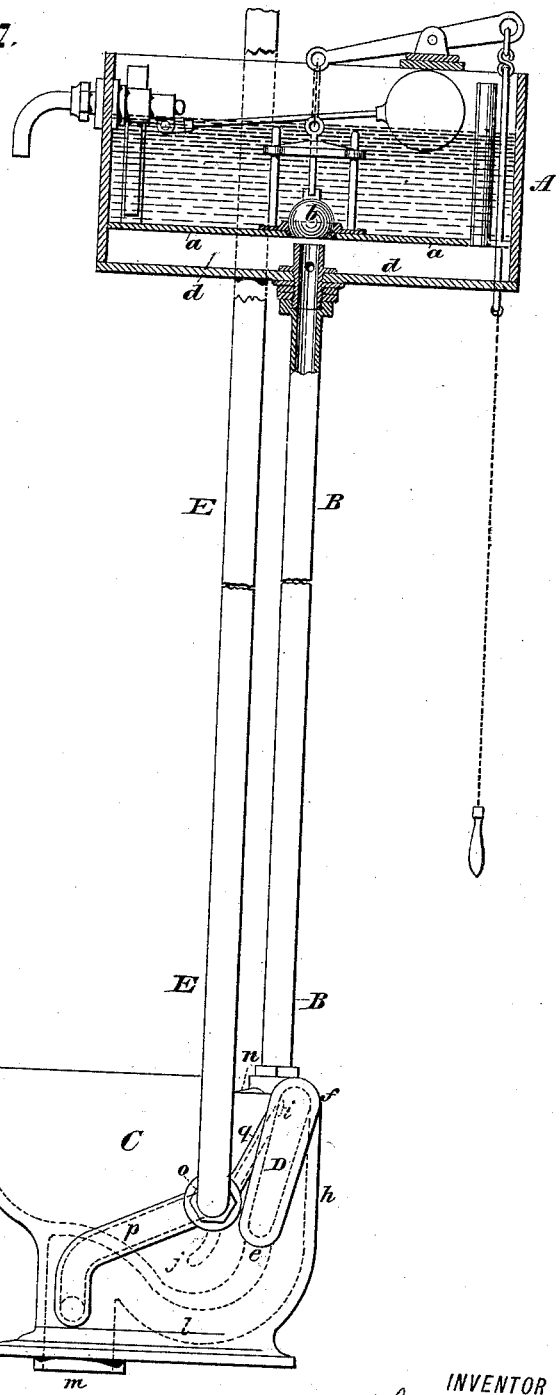
Figure 2:
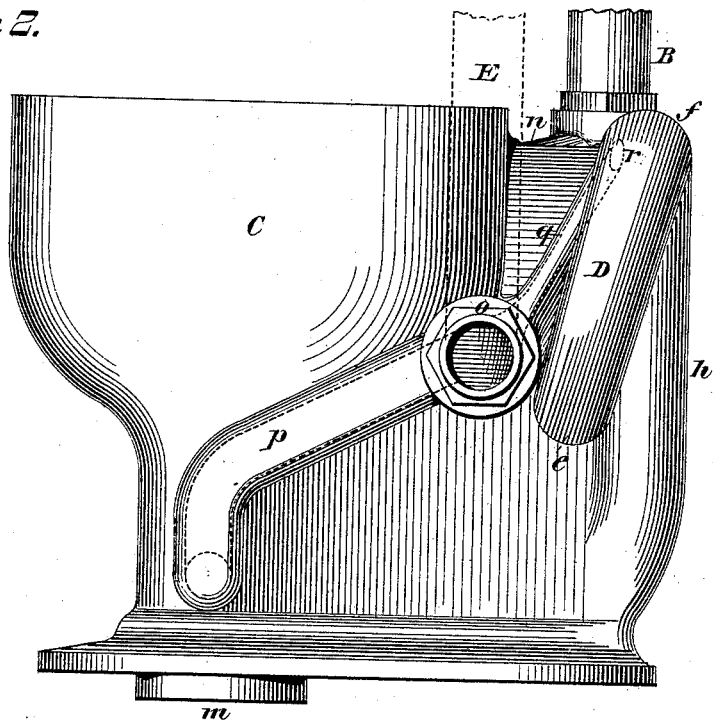
Figure 3:
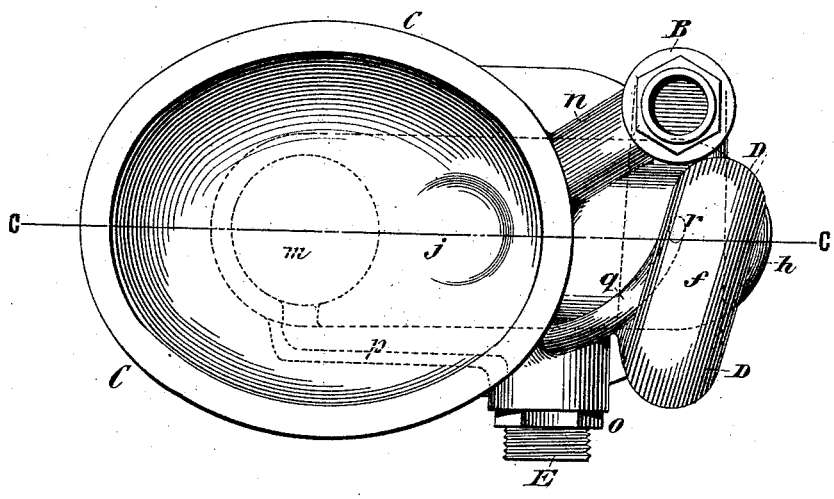
Figure 4:
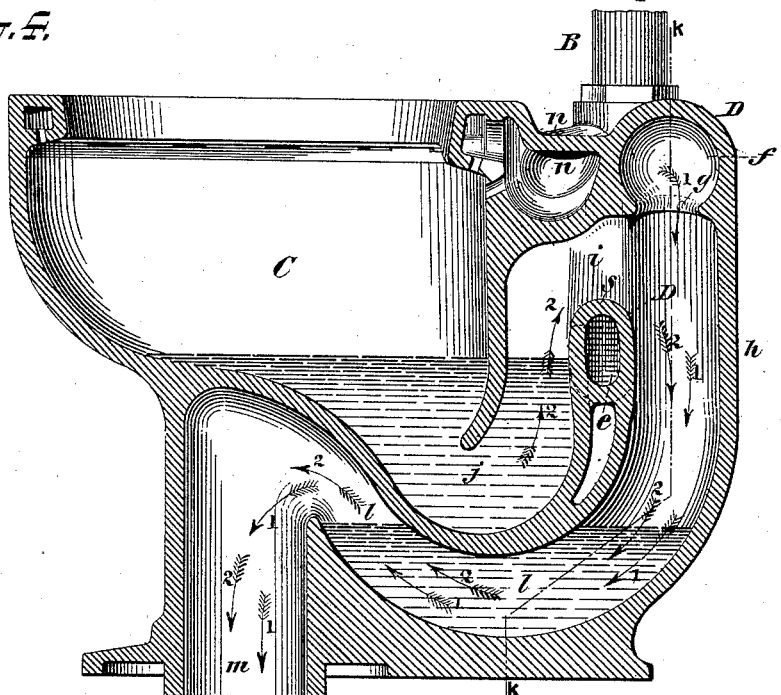
Figure 5:
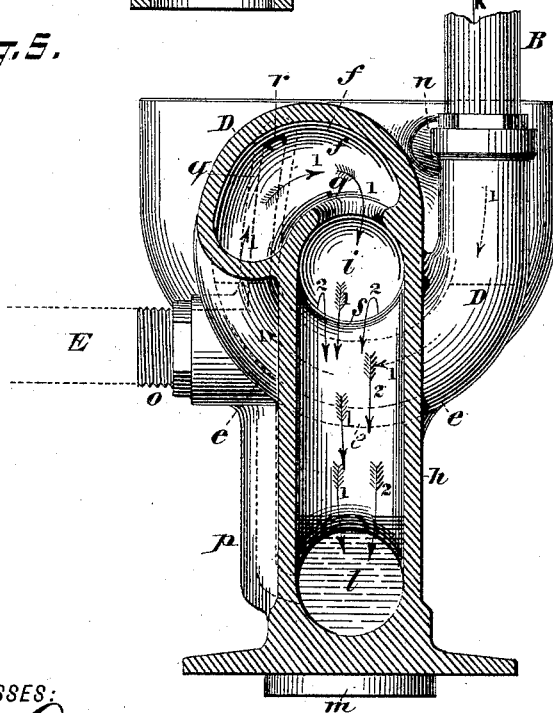

Figure 1 is a sectional side elevation of my improved water-closet, showing its connection with the tank. Fig. 2 is a side view of the closet-bowl. Fig. 3 is a top view of the same. Fig. 4 is a vertical central section on the line $c\,c$, Fig. 3; and Fig. 5 is a cross-section on the line $k\,k$, Fig. 4.

The principal object of this invention is to so construct the closet-bowl and its appendages that the escape of sewer-gas through the water-supply pipe and the tank will be effectually prevented.

My invention consists, principally, in venting the bent portion of the supply-pipe for the purpose of causing any gas therein collected to escape to the ventilating-pipe.

The invention also consists in further details of improvement that are hereinafter more fully specified.

In the accompanying drawings, the letter A represents the tank from which water is supplied to the bowl. B is the pipe leading from said tank to the bowl, and C is the water-closet bowl.

The tank A does not constitute part of this invention and is of ordinary kind; but for the purpose of understanding its operation in connection with my closet-bowl I will briefly describe the preferred form of tank which I propose to use—that is to say, the tank has a false bottom $a$, in which there is the seat for the valve $b$. The water-discharge pipe B enters the space $d$ beneath the false bottom $a$ and is perforated in that space, as shown. When the pipe B is to discharge water into the bowl, the valve $b$ is lifted by suitable means, and the water contained in the upper part of the tank rushes into the space $d$ and down through the pipe B, and when the tank above the false bottom $a$ has been entirely emptied the space $d$ below said false bottom will be full of water, which water will then continue to flow in a thin stream down through the pipe B, which it enters through the perforation or perforations in the upper portion of said pipe. The lower end of the pipe B connects with a convolute or bent pipe D, (see Fig. 5,) which pipe D forms a lower bend $e$, of semi-annular form, and an upper bend $f$, also of approximatively semi-annular form, the upper bend $f$ communicating by the aperture $g$ with the water-passage $h$. The upper part of this water-passage $h$ communicates at $i$ with the trap $j$ in the closet-bowl, while the lower end of the passage $h$ communicates directly with the lower trap $l$ of the bowl, and thence with the discharge-pipe $m$. A branch pipe $n$ extends from the lower portion of the pipe B into the upper part of the bowl C to supply said bowl with water for washing it.

E is the ventilating-pipe for carrying sewer-gas away to the roof or otherwise into the fresh air and to prevent siphonage in lower trap. This pipe E connects in the usual manner at $o$ with a pipe $p$, that ventilates the discharge-pipe $m$. Another pipe $q$ extends from the upper bend $f$ of the bent pipe D to the ventilating-pipe E, the upper bend $f$ having an aperture $r$ at its top (clearly shown in Fig. 5) for communicating with said vent-pipe $q$. The pipe $q$ should be closed when the flushing takes place and opened again to admit air to the trap D to cause water to remain in said trap. This I accomplish automatically as follows: When the water rushes down the pipe B, it expels the air from and completely fills the trap D and closes the opening $r$, which is situated above the normal level of the water in the trap D. When the water has finished passing through the pipe B and becomes low enough in D to uncover the opening $r$, air passes into the trap D through $q$ and $r$, thereby breaking the siphon in the trap and preventing all the water being siphoned from the trap D. By this means sufficient water is left in the trap D to prevent the passage of gas, &c. By the above construction the pipe $q$ is opened and closed automatically and no separate devices are needed to accomplish the result.

This being the construction of the closet in its general aspects, its operation is as follows: Supposing the closet-bowl to contain its proper quantity of water in the trap $j$ and also in the trap $l$, as indicated in Fig. 4, when now the valve $b$ of the tank is raised, the water rushes down through the pipe B into the bent pipe D, filling the same, and passing thence through this bent pipe D into the passage $h$ toward the trap $l$. This rush of water through the passage $h$ causes the trap $j$ to be siphoned out and causes the water to run from the trap $j$ over the dam $s$ into the trap $l$, while the trap $l$ discharges it into the discharge-pipe $m$. At the same time a stream of water from the pipe B passes through the branch $n$ into the bowl and washes the same, and the opening $r$ is closed by the water, as before stated. The arrows marked 1 in the drawings indicate the direction in which the water flows from the pipe B through the pipe D, passage $h$, and trap $l$ to the discharge-pipe $m$. The arrows 2 indicate the direction in which the water passes from the trap $j$ over the dam $s$ into the trap $l$, and thence to the discharge-pipe $m$. As soon as the full flow of water through the pipe B ceases and the valve $b$ regains its seat the upper bend $f$ of the pipe D will become emptied of water through the aperture $g$ and air will rush in to check the siphoning action; but the lower bend $e$ of said pipe D will always be full of water, thus furnishing a trap in the water-supply pipe which absolutely prevents any air or gas from the sewer going up through the pipe B into the tank A or into the bowl. As the main flow of water through the pipe B is stopped when the valve $b$ regains its seat, a thin stream of water will still pass through the pipe B until the space $d$ in the lower part of the tank A is empty. The vent-opening of the pipe $p$ in the discharge-pipe of the bowl is preferably located in the line of unobstructed flow of matter through the discharge-pipe, so that no solid matter passing therethrough can enter said vent-opening.

I have shown my invention applied to a bowl having two traps $j$ $l$; but it is applicable equally to a bowl having but one trap if the other trap is lower down, and I therefore desire it to be understood that I do not limit myself, so far as the use of my invention is concerned, to any particular kind of bowl or to any particular number of traps which said bowl may contain.

What I claim, and desire to secure by Letters Patent, is—

1. The combination of the water-closet bowl C, having trap $j$, dam $s$, and water-passage $h$, leading to discharge-pipe $m$, with the water-supply pipe B, terminating in the curved pipe D, that forms a trap and that communicates by the aperture $g$ with the passage $h$, said trap D having vent-opening $r$, in communication with the ventilating-pipe E and with the branch $n$, substantially as herein shown and described.

2. The combination of the water-supply pipe B, branch $n$, and trap D, having vent $r$ in its upper portion, with the air-pipe $q$, leading from the vent $r$ to the ventilating-pipe E, the pipe E being also connected with the siphon-trap, whereby two points of the water-closet are ventilated by the pipe E, substantially as described.

FRED ADEE.

Witnesses:
ARTHUR V. BRIESEN,
THORNLEY DICKSON.